United States Patent
Nimbalker et al.

(10) Patent No.: US 11,632,205 B2
(45) Date of Patent: *Apr. 18, 2023

(54) NR PEAK RATE AND TRANSPORT BLOCK SIZE

(71) Applicant: Telefonaktiebolaget LM Ericsson (publ), Stockholm (SE)

(72) Inventors: Ajit Nimbalker, Fremont, CA (US); Jung-Fu Cheng, Fremont, CA (US); Ravikiran Nory, San Jose, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 52 days.

This patent is subject to a terminal disclaimer.

(21) Appl. No.: 17/207,920

(22) Filed: Mar. 22, 2021

(65) Prior Publication Data

US 2021/0298012 A1 Sep. 23, 2021

Related U.S. Application Data

(63) Continuation of application No. 16/910,220, filed on Jun. 24, 2020, now Pat. No. 10,958,392, which is a continuation of application No. PCT/SE2019/050476, filed on May 24, 2019.

(60) Provisional application No. 62/713,658, filed on Aug. 2, 2018.

(51) Int. Cl.
*H04L 5/00* (2006.01)
*H04L 27/26* (2006.01)

(52) U.S. Cl.
CPC ............ *H04L 5/001* (2013.01); *H04L 5/0046* (2013.01); *H04L 27/2602* (2013.01); *H04L 27/2604* (2013.01); *H04L 27/26025* (2021.01)

(58) Field of Classification Search
CPC .... H04L 5/0046; H04L 27/2604; H04L 5/001
See application file for complete search history.

(56) References Cited

U.S. PATENT DOCUMENTS

| | | | |
|---|---|---|---|
| 8,149,947 B2 | 4/2012 | Casamajou |
| 8,644,170 B2 | 2/2014 | Jalili |
| 10,484,997 B2 | 11/2019 | Zhang |
| 2007/0097851 A1 | 5/2007 | Adachi |

(Continued)

FOREIGN PATENT DOCUMENTS

| JP | 2018512002 A | * | 4/2018 |
|---|---|---|---|
| WO | 2017 209585 A1 | | 12/2017 |

OTHER PUBLICATIONS

Examination Report issued by Intellectual Property India for Application No. 202117002960—dated Jan. 7, 2022.

(Continued)

*Primary Examiner* — Jean B Corrielus
(74) *Attorney, Agent, or Firm* — Baker Botts L.L.P.

(57) ABSTRACT

According to certain embodiments, a method is disclosed for operating a user equipment. The method comprises transmitting or receiving a transmission on at least one of the component carriers, wherein the at least one component carrier is associated with a slot duration that corresponds to a numerology of the component carrier. The transmitting or receiving on the at least one of the component carriers is based on a relation between a number of information bits on the at least one of the component carriers over one or more reference slot durations and a reference data rate.

12 Claims, 6 Drawing Sheets

(56) References Cited

U.S. PATENT DOCUMENTS

2013/0308504 A1  11/2013  Nimbalker et al.
2015/0311988 A1  10/2015  Baldemair

OTHER PUBLICATIONS

3GPP TSG RAN WG1 Meeting NR#4; Vancouver, Canada; Source: Intel Corporation; Title: On UE peak data rate (R1-1800345)—January 22-26, 2018.
International Search Report issued for International application No. PCT/SE2019/050476—Jul. 5, 2019.
3GPP TS 38.214 v15.0.0; Technical Specification; 3rd Generation Partnership Project; Technical Specification Group Radio Access Network; NR; Physical layer procedures for data (Release 15)—Dec. 2017.
3GPP TS 38.306 v15.2.0; Technical Specification; 3rd Generation Partnership Project; Technical Specification Group Radio Access Network; NR; User Equipment (UE) radio access capabilities (Release 15)—Jun. 2018.
PCT Written Opinion of the International Preliminary Examining Authority issued for International application No. PCT/SE2019/050476—May 18, 2020.

* cited by examiner

NR PEAK RATE AND TRANSPORT BLOCK SIZE

PRIORITY

This application is a continuation, under 35 U.S.C. § 120 of U.S. patent application Ser. No. 16/910,220 filed on Jun. 24, 2020, now U.S. Pat. No. 10,958,392, which is a continuation under 35 U.S.C. 111(a) of co-pending International Patent Application Aerial No. PCT/SE2019/050476 filed May 24, 2019 and entitled "NR PEAK RATE AND TRANSPORT BLOCK SIZE" which claims priority to U.S. Provisional Patent Application No. 62/713,658 filed Aug. 2, 2018 both of which are hereby incorporated by reference in their entirety.

TECHNICAL FIELD

The disclosure relates, in general, to wireless communications and, more particularly, to methods and apparatuses for transmitting or receiving a transmission in carrier aggregation.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

New radio (NR) standard in 3GPP is being designed to provide service for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high reliability transmission but perhaps for moderate data rates.

One of the solutions for low latency data transmission is shorter transmission time intervals. In NR, in addition to transmission in a slot, a mini-slot transmission is also allowed to reduce latency. A mini-slot may consist of any number of 1 to 14 OFDM symbols. It should be noted that the concepts of slot and mini-slot are not specific to a specific service meaning that a mini-slot may be used for eMBB, URLLC, or other services.

SUMMARY

Certain problems exist. For example, unlike LTE, NR transmission duration for a packet, processing times, transmission bandwidths are quite flexible, and therefore, how to define the peak data rate and its implications on scheduling decisions (e.g. transport block size) are not clearly defined. There is a need to design solutions that can reflect reasonably well the impact of peak data rate on scheduling decisions such as transport block size. In particular, the method needs to address the cases where UE capability signalling can include multiple parameters that together are used for defining an approximate peak data rate, including a scaling factor that can at least take values 1, 0.8, 0.75 and 0.4. This needs to be further addressed for cases including multiple numerologies, multiple carriers with same or different numerologies, dual connectivity cases, etc.

Certain aspects of the present disclosure and their embodiments may provide solutions to these or other challenges. For example, according to certain embodiments, a method of operating a user equipment is provided. The method comprises transmitting or receiving a transmission on at least one of a plurality of component carriers (CC), wherein the at least one component carrier is associated with a slot duration that corresponds to a numerology of the component carrier. The transmitting or receiving is based on a relation between a number of information bits on the at least one of the component carriers over one or more reference slot durations and a reference data rate, wherein the one or more reference slot durations include at least the slot duration associated with the at least one of the component carriers.

Also disclosed is a user equipment (UE). The UE comprises a receiver, a transmitter, and processing circuitry coupled to the receiver and the transmitter. The processing circuitry is configured to transmit or receive a transmission on at least one of a plurality of component carriers, wherein the at least one component carrier is associated with a slot duration that corresponds to a numerology of the component carrier. The transmitting or receiving is based on a relation between a number of information bits on the at least one of the component carriers over one or more reference slot durations and a reference data rate, wherein the one or more reference slot durations include at least the slot duration associated with the at least one of the component carriers.

Also disclosed is a computer program, the computer program comprising instructions configured to perform a method. The method comprises transmitting or receiving a transmission on at least one of a plurality of component carriers, wherein the at least one component carrier is associated with a slot duration that corresponds to a numerology of the component carrier. The transmitting or receiving is based on a relation between a number of information bits on the at least one of the component carriers over one or more reference slot durations and a reference data rate, wherein the one or more reference slot durations include at least the slot duration associated with the at least one of the component carriers.

Also disclosed is a computer program product comprising a computer program, the computer program comprising instructions which when executed on a computer perform a method. The method comprises transmitting or receiving a transmission on at least one of a plurality of component carriers, wherein the at least one component carrier is associated with a slot duration that corresponds to a numerology of the component carrier. The transmitting or receiving is based on a relation between a number of information bits on the at least one of the component carriers over one or more reference slot durations and a reference data rate, wherein the one or more reference slot durations include at least the slot duration associated with the at least one of the component carriers.

Also disclosed is a non-transitory computer-readable storage medium comprising a computer program, the computer program comprising instructions which when executed on a computer perform a method. The method comprises transmitting or receiving a transmission on at least one of a plurality of component carriers, wherein the at least one component carrier is associated with a slot duration that corresponds to a numerology of the component carrier. The transmitting or receiving is based on a relation between a number of information bits on the at least one of the component carriers over one or more reference slot durations and a reference data rate, wherein the one or more reference slot durations include at least the slot duration associated with the at least one of the component carriers.

According to another embodiment, a method of operating a network node in a wireless communication system is provided. The method comprises transmitting or receiving a transmission on at least one of a plurality of component carriers, wherein the at least one component carrier is associated with a slot duration that corresponds to a numerology of the component carrier. The transmitting or receiving is based on a relation between a number of information bits on the at least one of the component carriers over one or more reference slot durations and a reference data rate, wherein the one or more reference slot durations include at least the slot duration associated with the at least one of the component carriers.

Also disclosed is a network node. The network node comprises a receiver, a transmitter, and processing circuitry coupled to the receiver and the transmitter. The processing circuitry is configured to transmit or receive a transmission on at least one of a plurality of component carriers, wherein the at least one component carrier is associated with a slot duration that corresponds to a numerology of the component carrier. The transmitting or receiving is based on a relation between a number of information bits on the at least one of the component carriers over one or more reference slot durations and a reference data rate, wherein the one or more reference slot durations include at least the slot duration associated with the at least one of the component carriers.

Also disclosed is a computer program, the computer program comprising instructions configured to perform a method. The method comprises transmitting or receiving a transmission on at least one of a plurality of component carriers, wherein the at least one component carrier is associated with a slot duration that corresponds to a numerology of the component carrier. The transmitting or receiving is based on a relation between a number of information bits on the at least one of the component carriers over one or more reference slot durations and a reference data rate, wherein the one or more reference slot durations include at least the slot duration associated with the at least one of the component carriers.

Also disclosed is a computer program product comprising a computer program, the computer program comprising instructions which when executed on a computer perform a method. The method comprises transmitting or receiving a transmission on at least one of a plurality of component carriers, wherein the at least one component carrier is associated with a slot duration that corresponds to a numerology of the component carrier. The transmitting or receiving is based on a relation between a number of information bits on the at least one of the component carriers over one or more reference slot durations and a reference data rate, wherein the one or more reference slot durations include at least the slot duration associated with the at least one of the component carriers.

Also disclosed is a non-transitory computer-readable storage medium comprising a computer program, the computer program comprising instructions which when executed on a computer perform a method. The method comprises transmitting or receiving a transmission on at least one of a plurality of component carriers, wherein the at least one component carrier is associated with a slot duration that corresponds to a numerology of the component carrier. The transmitting or receiving is based on a relation between a number of information bits on the at least one of the component carriers over one or more reference slot durations and a reference data rate, wherein the one or more reference slot durations include at least the slot duration associated with the at least one of the component carriers.

Certain embodiments may provide one or more of the following technical advantages. For example, one technical advantage may be that certain embodiments accommodate complexity and decoding constraints at the UE while also keeping the scheduler restrictions to a minimum.

BRIEF DESCRIPTION OF THE DRAWINGS

The invention may best be understood by referring to the following description and accompanying drawings that are used to illustrate particular embodiments of the invention. In the drawings.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 2:
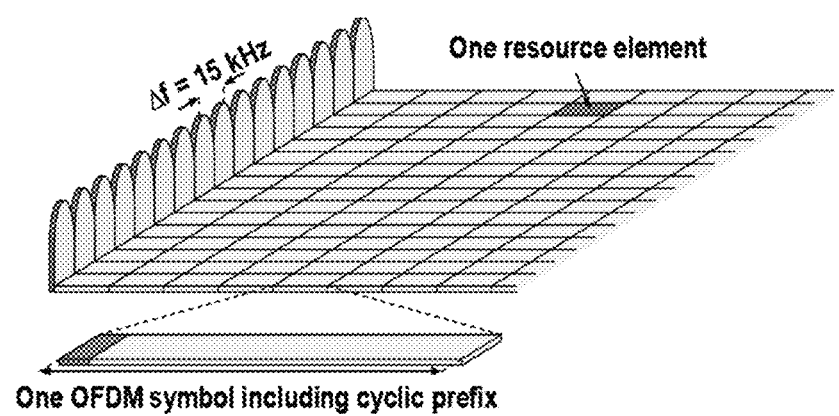
FIG. 2 illustrates an example radio resource in NR, according to certain embodiments.

FIG. 2 is a block diagram illustrating an embodiment of a network 100, in accordance with certain embodiments. Network 100 includes one or more UE(s) 110 (which may be interchangeably referred to as wireless devices 110) and one or more network node(s) 115. UEs 110 may communicate with network nodes 115 over a wireless interface. For example, a UE 110 may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell 125. In some embodiments, UEs 110 may have device-to-device (D2D) capability. Thus, UEs 110 may be able to receive signals from and/or transmit signals directly to another UE.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network 120. Interconnecting network 120 may refer to any interconnecting system capable of transmitting audio, video, signals, data, messages, or any combination of the preceding. Interconnecting network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 110. UEs 110 may exchange certain signals with the core network node using the non-access stratum layer. In non-access stratum signaling, signals between UEs 110 and the core network node may be transparently passed through the radio access network. In certain embodiments, network nodes 115 may interface with one or more network nodes over an internode interface, such as, for example, an X2 interface.

As described above, example embodiments of network 100 may include one or more wireless devices 110, and one or more different types of network nodes capable of communicating (directly or indirectly) with wireless devices 110.

In some embodiments, a network node may correspond to any type of radio network node or any network node, which communicates with a UE (directly or via another node) and/or with another network node. Examples of network nodes are NodeB, MeNB, ENB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc), O&M, OSS, SON, positioning node (e.g. E-SMLC), MDT, test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, UE category M1, UE category M2, ProSe UE, V2V UE, V2X UE, etc.

The Third Generation Partnership Project 3GPP is defining technical specifications for New Radio (NR) (e.g., 5G). In release 15 (Rel-15) NR, a user equipment (UE) can be configured with up to four carrier bandwidth parts (BWPs) in the downlink with a single downlink carrier bandwidth part being active at a given time. A UE can be configured with up to four carrier bandwidth parts in the uplink with a single uplink carrier bandwidth part being active at a given time. If a UE is configured with a supplementary uplink, the UE can additionally be configured with up to four carrier bandwidth parts in the supplementary uplink with a single supplementary uplink carrier bandwidth part being active at a given time.

For a carrier bandwidth part with a given numerology $\mu_i$, a contiguous set of physical resource blocks (PRBs) are defined and numbered from 0 to $N_{BWP,i}^{size}-1$, where i is the index of the carrier bandwidth part. A resource block (RB) is defined as 12 consecutive subcarriers in the frequency domain.

Numerologies

Multiple orthogonal frequency-division multiplexing (OFDM) numerologies, $\mu$, are supported in NR as given by Table 1, where the subcarrier spacing, $\Delta f$, and the cyclic prefix for a carrier bandwidth part are configured by different higher layer parameters for downlink (DL) and uplink (UL), respectively.

TABLE 1

Supported transmission numerologies.

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For a CC, the slot duration corresponds to the numerology $\mu$ of the CC, such that the slot duration (in seconds) is given by $0.001*2^{-\mu}$, i.e. $10^{-3}/2^\mu$.

Physical Channels

A downlink physical channel corresponds to a set of resource elements carrying information originating from higher layers. The following downlink physical channels are defined:

Physical Downlink Shared Channel, PDSCH
Physical Broadcast Channel, PBCH
Physical Downlink Control Channel, PDCCH PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI), mainly scheduling decisions, required for reception of PDSCH, and for uplink scheduling grants enabling transmission on PUSCH.

An uplink physical channel corresponds to a set of resource elements carrying information originating from higher layers. The following uplink physical channels are defined:

Physical Uplink Shared Channel, PUSCH
Physical Uplink Control Channel, PUCCH
Physical Random Access Channel, PRACH PUSCH is the uplink counterpart to the PDSCH. PUCCH is used by UEs to transmit uplink control information, including HARQ acknowledgements, channel state information reports, etc. PRACH is used for random access preamble transmission.

In a particular embodiment, transmitting a transmission may involve that the UE transmits an uplink transmission on one or more of the PUSCH, PUCCH, and PRACH, wherein the uplink transmission may be on a plurality of uplink component carriers. Furthermore, in a particular embodiment, receiving a transmission may involve that the UE receives a downlink transmission on one or more of the PDSCH, PBCH, and PDCCH, wherein the downlink transmission may be on a plurality of downlink component carriers.

In a particular embodiment, transmitting a transmission may involve that the network node transmits a downlink transmission on one or more of the PDSCH, PBCH, and PDCCH, wherein the downlink transmission may be on a plurality of downlink component carriers. Furthermore, in a particular embodiment, receiving a transmission may involve that the network node receives an uplink transmission on one or more of the PUSCH, PUCCH, and PRACH, wherein the uplink transmission may be on a plurality of uplink component carriers.

Data Rate and Maximum Data Rate

An example peak rate formula follows below. For NR, the approximate data rate for a given number of aggregated carriers in a band or band combination is computed as follows.

$$\text{data rate(in Mbps)} = 10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^\mu} \cdot (1 - OH^{(j)}) \right) \quad (1)$$

wherein:

J is the number of aggregated component carriers in a band or band combination $R_{max}=948/1024$ For the j-th CC, $v_{Layers}^{(j)}$ is the maximum number of layers $Q_m^{(j)}$ is the maximum modulation order $f^{(j)}$ is the scaling factor The scaling factor can take the values 1, 0.8, 0.75, and 0.4.

$f^{(j)}$ is signaled per band and per band combination

μ is the numerology (as defined in TS 38.211 [6])

$T_s^\mu$ is the average OFDM symbol duration in a subframe for numerology $\mu$, i.e.

$$T_s^\mu = \frac{10^{-3}}{14 \cdot 2^\mu}.$$

Note that normal cyclic prefix is assumed.

$N_{PRB}^{BW(j),\mu}$ is the maximum RB allocation in bandwidth $BW^{(j)}$ with numerology μ, as defined in 5.3 TS 38.101-1 [2] and 5.3 TS 38.101-2 [3], where $BW^{(j)}$ is the UE supported maximum bandwidth in the given band or band combination.

$OH^{(j)}$ is the overhead and takes the following values:

[0.14], for frequency range FR1 for DL
[0.18], for frequency range FR2 for DL
[0.08], for frequency range FR1 for UL
[0.10], for frequency range FR2 for UL It should be noted that only one of the UL or SUL carriers (the one with the higher data rate) is counted for a cell operating SUL.

The approximate maximum data rate can be computed as the maximum of the approximate data rates computed using the above formula for each of the supported band or band combinations.

Data rate is an important performance indicator for communication links and applies to 5G radio systems. Mobile vendors, mobile operators as well as network vendors typically use peak data rate as a key performance indicator (KPI) and use it for promoting their respective products or solutions. The peak data rate is an indicator of the processing/hardware/software/firmware capabilities from the device perspective, especially the decoder throughput for receiver operations and encoder throughputs for encoding operations. There is a need to take into account the peak rate for utilization on a communication link in a somewhat unambiguous fashion by the physical layer processing functions in a typical network scheduler or in a device.

Typically, data rate can be defined as maximum TBS bits (or information bits) per transmission time interval. Since, both the max TBS bits or the transmission time interval can be variable in NR, the maximum across all computed data rates can be defined as the maximum data rate or the peak rate. Then, from a TBS perspective, a TB can be considered decodable by a decoder supporting a throughput of maxDataRate, if the transport block size does not exceed the maxDataRate*transmissionDuration. Note that in Code block group based where an initial or a retransmission of transport block comprises only a portion of the transport block bits, the receiver may be expected to perform physical layer decoding of only a portion of the transport block bits. Thus, that can be a better indicator of the required decoder throughput. In certain scenarios, such as LTE-NR dual connectivity, the overall peak data rate offered by a UE can be expressed as sum total of the peak rates obtained from the NR and LTE links operating simultaneously. Since LTE and NR use different encoding/decoding techniques, it is not simple to enable hardware sharing of blocks such as low-density parity-check (LDPC) decode and turbo decoder, except for some minimal reuse. In the present disclosure, most of the description related to peak rate or maximum data rate assumes its applicability to only the NR portion of the link. For example, if LTE offers 1 Gbps and NR offers 1 Gbps, the UE's total peak data rate across LTE and NR is 2 Gbps, while its NR peak rate or simply peak rate can be 1 Gbps.

For NR dynamic transmission duration L, the maximum TBS in L symbols in numerology of μ (e.g. μ=0 corresponds to 1 ms slot with 15 kHz SCS, μ=1 is 0.5 ms slot with 30 kHz SCS) can be given by:

$$TBS_{max} \leq (L/14) * \text{max DataRate} * 1e\text{-}3 * 2^{-\mu} \quad (2)$$

There is a need to address two issues:
1. What potential overhead difference is possible between RAN2 spec peak rate and L1 peak rate?
2. How to define L1 peak rate and association with TBS and transmission durations?
   a. How to reflect the scaling factor (SCF) from the PHY perspective?

Overhead Analysis:

RAN1 has defined approximate peak rate based on average overheads for use in RAN2 spec (for L2 buffer calculation). If the same formula is used for defining the absolute L1 peak rate, there will be an overall loss because the overheads can be as large as 14% (for FR1, DL). For example, as shown below for 30 kHz SCS, the difference between the maximum TBS based on the formula from RAN2 (with OH=14%) and that from TBS calculation (from RAN1 spec) is approximately 10%. One option is to change the overhead from 0.14 to 0.059 (recommended OH) in RAN2 spec.

| FR | scs | nPRB | n_layers | Qm | TBS | slot | TBS data rate | Data rate (RAN2) | OH (RAN2) | recOH |
|---|---|---|---|---|---|---|---|---|---|---|
| FR1 | 1 | 273 | 2 | 8 | 638984 | 0.5 | 1.277968 | 1.1685 | 0.14 | 0.059 |
| FR1 | 1 | 273 | 4 | 8 | 1277992 | 0.5 | 2.555984 | 2.337 | 0.14 | 0.059 |

There are several cases to consider:
Single CC
  SCF=1
    Considering all SCS, 1/2/4 layers, type A and B DMRS patterns, UE reported scaling factor SCF=1, and 1024, the OH value that will enable the maximum TBS to be decodable (i.e. not exceed the maxDataRate*transmissionDuration) is given in the table below.
    In this example, we consider the PDSCH occupies the entire system BW and only DMRS overhead is considered.

|  | FR1 | FR2 |
|---|---|---|
| Only L = 14 duration | 0.059 | 0.062 |
| Only L = 2/4/7/14 durations | 0.037 | 0.04 |
| L = 2 to 14 symbols | 0.012 | 0.019 |

Considering data rate definition from only slots of 14 symbol duration, if the OH is adjusted to 0.059 in the formula applied in RAN2 specification, then the ensuing data rate could be considered as true or L1 data rate.

If transmissions of shorter duration (2/4/7/14) are considered while calculating the peak data rate, then the OH needs to be adjusted to 0.037 in the formula applied in RAN2 specification.

Thus, according to certain embodiments, a method is disclosed, where the overhead value in peak rate calculation is adjusted to a value lower than 0.05. This can consider the variable time duration of transport block size transmission.

The overhead may be defined separately for downlink and uplink, and possibly for other links such as sidelink and/or access or backhaul links.

How to Reflect the Data Rate Constraint on the UE Side

Figure 3:
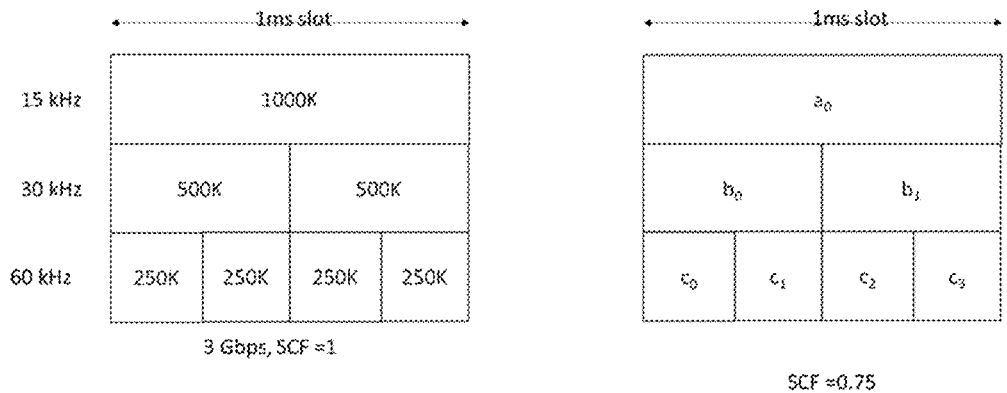
FIG. 3 illustrates the corresponding limits on the transport block size in each carrier, according to certain embodiments.

Take the following illustrative example, where UE has three carriers, and each carrier corresponds to a data rate of ~1 Gbps, and assume each carrier has a different numerology. FIG. 3 illustrates the corresponding limits on the transport block size in each carrier, according to certain embodiments. (In practice, the carriers may have different data rates based on number of supported layers, bandwidth, Modulation order, etc).

Now assume that UE reports a scaling factor of 0.75 for each of the three carriers (which may be in same or different bands), which restricts the peak rate to 3×0.75=2.25 Gbps. Then the question is how to define constraints on TBS for the case of right-hand side of FIG. 3.

Depending on the PDCCH placement, DMRS for PDSCH (front-loaded or not), etc, for each of the carriers, the associated processing load on the decoder hardware may be different. However, the maximum TBS bits or some such constraint can be defined over a reference time interval suitably defined.

According to certain embodiments, a reference time interval such as reference slot duration and a condition to be satisfied by a reference number of information bits within the reference time interval are defined, where the condition may correspond to a relation between a number of information bits on the at least one of the component carriers over one or more reference slot durations and a reference data rate. Transmitting or receiving a transmission may be based on this relation. The reference time interval may correspond to the reference slot duration. The information bits can be the transport block bits (or sum thereof) or the code block bits (or sum thereof). The latter can take into account code-block group based transmissions, where an initial or a retransmission of transport block comprises only a portion of the transport block bits, and the receiver may be expected to perform physical layer decoding of only a portion of the transport block bits and, thus, can be a better indicator of the required decoder throughput. According to certain embodiments, multiple reference time intervals may be defined, and the corresponding conditions may be defined to reflect the effect of data rate.

Some examples are provided below:
Example 1: For single CC, with a numerology-$\mu$, the slot duration (in seconds) is given by $0.001*2^{-\mu}$, the reference slot duration is given by $0.001*2^{-\mu}$, and the reference number of information bits is given by
  Option 1: sum total of transport block bits scheduled with a single slot of the CC.
    Sum(TBS bits over the slot)<DataRate*SlotDuration
  Option 2: sum total of code block bits scheduled with a single slot of the CC.
    Sum(code blocks bits over the slot)<DataRate*SlotDuration Example 2: For multiple CC, with a single numerology-$\mu$, the slot duration is given by $0.001*2^{-\mu}$, the reference slot duration can be given by $0.001*2^{-\mu}$, and the reference number of information bits can be given by
  Option 1: sum total of transport block bits scheduled with a single slot across the multiple carriers.
    Sum(TBS bits over the slot)<DataRate*SlotDuration
  Option 2: sum total of code block bits scheduled with a single slot across the multiple carriers.
    Sum(code blocks bits over the slot)<DataRate*SlotDuration Example 3: For multiple CC, with a different CCs on different numerologies ($\mu_0, \mu_1, \mu_2, \ldots, \mu_{n-1}$) the slot durations are different for different carriers, the reference slot duration can be given by a reference numerology $\mu_{ref}$, and given by $0.001*2^{-\mu_{ref}}$, and the reference number of information bits is given by
  Option 1: sum total of transport block bits scheduled with a single slot across the multiple carriers.
    Sum(TBS bits over the reference slot duration)<DataRate*SlotDuration
  Option 2: sum total of code block bits scheduled with a single slot across the multiple carriers.
    Sum(code blocks bits over the reference slot duration)<DataRate*SlotDuration
  In this case, since there can be multiple overlapping slots of different duration, the information bits from different carrier may have be scaled suitably to determine the reference number of information bits
  Only one single reference slot duration may be defined or multiple reference slot durations may be defined. The multiple reference slot durations may include all slot durations associated with the plurality of component carriers. The multiple reference slot durations may correspond to the slot durations associated with the plurality of component carriers.

Referring again to FIG. 3, denote $a_0$ as the number of transport block bits (or code block bits) in the 1 ms slot duration for SCS of 15 kHz. This 1 ms slot overlaps two slots of 30 kHz SCS, and four slots of the 60 kHz SCS. Similarly, one slot of 30 KHz SCS overlaps two slots of 60 KHz.

Denote by $b_0$, $b_1$ number of transport block bits (or code block bits) in the two slots for SCS of 30 kHz, respectively.

Denote by $c_0$, $c_1$, $c_2$, $c_3$ the number of transport block bits (or code block bits) in the four slots for SCS of 60 kHz, respectively.

For 1 ms reference interval: a condition on may be defined as follows:

$$a_0 + \Sigma_{n=0}^{1} b_n + \Sigma_{n=0}^{3} c_n \leq \text{DataRate} * 1 \text{ ms} \quad (3)$$

For 0.5 ms reference interval: a condition(s) on may be defined as follows:

$$\frac{a_0}{2} + b_0 + c_0 + c_1 \leq \text{DataRate} * 0.5 \text{ ms} \quad (4)$$

$$\frac{a_0}{a_0} + b_1 + c_2 + c_3 \leq \text{DataRate} * 0.5 \text{ ms} \quad (5)$$

where the scaling factor applied for TBS of a component carrier with numerology $\mu$ is $2^{\wedge}(\mu-\mu_{ref})$, when $\mu<=\mu_{ref}$ (e.g. for $\mu=0$ for 15 kHz, and $\mu_{ref}=1$ for 30 kHz=>Scaling for $\mu=0$ is 0.5)

For 0.25 ms reference interval: a condition(s) on may be defined as follows:
for (i,j) in {(0,0), (0,1), (1,2), (1,3)}:

$$\frac{a_0}{4} + \frac{b_i}{2} + c_j \leq \text{DataRate} * 0.25 \text{ ms}$$

where the scaling factor applied for component carrier with numerology $\mu$ is $2^{\wedge}(\mu-\mu_{ref})$, e.g. for $\mu=0$ for 15 kHz, and $\mu_{ref}=2$ for 60 kHz=>Scaling for $\mu=0$ is 0.25, and for $\mu=1$ is 0.5.

More generally, if the UE is configured with one or more carriers with numerologies given by $\{\mu_0, \mu_1, \ldots \mu_{N-1}\}$, if the reference numerology is $\mu_{ref}$, then the constraint may be given as follows:

$$\sum_{n=0}^{N-1} TBS_n * 2^{\mu_n - \mu_{ref}} \leq \text{DataRate} * 0.001 * 2^{-\mu_{ref}} \quad (6)$$

Wherein $TBS_n$ denotes the transport block size scheduled on CC-n over a reference slot duration $0.001*2^{-\mu_{ref}}$ wherein if $\mu_n \leq \mu_{ref}$, the $TBS_n$ corresponds to the sum of the transport block sizes on CC-n on the slot that overlaps the reference slot duration, and if $\mu_n \rightarrow \mu_{ref}$, the $TBS_n$ corresponds to the sum total of transport block sizes on CC-n on the slots that overlaps the reference slot duration.

Based on formula (6), the following formula could be mathematically derived, where the constraint may be given as:

$$\sum_{n=0}^{N-1} \frac{TBS_n}{10^{-3}/2^{\mu_n}} \leq \text{DataRate} \quad (7)$$

In certain embodiments, a method of operating a user equipment is provided. The method comprises transmitting or receiving a transmission on at least one of a plurality of component carriers (CC), wherein the at least one component carrier is associated with a slot duration that corresponds to a numerology of the component carrier. The transmitting or receiving is based on a relation between a number of information bits on the at least one of the component carriers over one or more reference slot durations and a reference data rate, wherein the one or more reference slot durations include at least the slot duration associated with the at least one of the component carriers. The relation may correspond to the constraints given in e.g. formula (6) or (7).

In certain embodiments a user equipment (UE) is provided. The UE comprises a receiver, a transmitter, and processing circuitry coupled to the receiver and the transmitter. The processing circuitry is configured to transmit or receive a transmission on at least one of a plurality of component carriers, wherein the at least one component carrier is associated with a slot duration that corresponds to a numerology of the component carrier. The transmitting or receiving is based on a relation between a number of information bits on the at least one of the component carriers over one or more reference slot durations and a reference data rate, wherein the one or more reference slot durations include at least the slot duration associated with the at least one of the component carriers. The relation may correspond to the constraints given in e.g. formula (6) or (7).

In certain embodiments, a method of operating a network node in a wireless communication system is provided. The method comprises transmitting or receiving a transmission on at least one of a plurality of component carriers, wherein the at least one component carrier is associated with a slot duration that corresponds to a numerology of the component carrier. The transmitting or receiving is based on a relation between a number of information bits on the at least one of the component carriers over one or more reference slot durations and a reference data rate, wherein the one or more reference slot durations include at least the slot duration associated with the at least one of the component carriers. The relation may correspond to the constraints given in e.g. formula (6) or (7).

In certain embodiments, a network node is provided. The network node comprises a receiver, a transmitter, and processing circuitry coupled to the receiver and the transmitter. The processing circuitry is configured to transmit or receive a transmission on at least one of a plurality of component carriers, wherein the at least one component carrier is associated with a slot duration that corresponds to a numerology of the component carrier. The transmitting or receiving is based on a relation between a number of information bits on the at least one of the component carriers over one or more reference slot durations and a reference data rate, wherein the one or more reference slot durations include at least the slot duration associated with the at least one of the component carriers. The relation may correspond to the constraints given in e.g. formula (6) or (7).

In a particular embodiment, receiving the transmission may involve at least partially skip decoding the transmission. At least partially skip decoding a transmission may involve e.g. decoding the transmission, processing the transport block(s) partially, or fully skip decoding the transmission.

In a particular embodiment, transmitting the transmission may involve at least partially skip transmitting the transmission. At least partially skip transmitting a transmission may involve e.g. transmitting the transmission, transmitting any ongoing transmission, or dropping the transmission. Dropping the transmission may involve fully skip transmitting the transmission.

In a particular embodiment, the one or more reference slot durations may include all slot durations associated with the plurality of component carriers. In a particular embodiment, transmitting or receiving may be based on a relation between a number of information bits on the at least one of the component carriers over one or more slot durations and a reference data rate, wherein the slot durations are the slot durations associated with the plurality of component carriers. The slot durations may correspond to $10^{-3}/2^{\mu_n}$, where $\mu_n$ is the numerology of the carrier n, where n=0, ..., N−1.

In a particular embodiment, the number of information bits may be based on at least a number of transport block bits within a slot of the at least one of the component carriers. The number of information bits may correspond to $TBS_n$ in e.g. formula (6) or (7). The number of information bits may correspond to the sum of the number of transport block bits in one slot on one component carrier.

In a particular embodiment, the relation may require that the number of information bits on the at least one of the component carriers over the one or more reference slot durations is less than or equal to the reference data rate. In a particular embodiment, the relation may require that the constraints in formulas (6) or (7) holds. If the constraints does not hold, the user equipment or the network node may partially skip transmitting the transmission or partially skip receiving the transmission.

In a particular embodiment, the reference data rate may be a maximum data rate of the user equipment on the plurality of component carriers. The reference data rate and/or the maximum data rate may be calculated based on formula (1).

In a particular embodiment, the reference data rate may be based on a UE capability signaling. In a particular embodiment, the reference data rate may be based on at least one or more of a supported modulation order, a number of layers, a bandwidth, and/or a scaling factor.

In a particular embodiment, at least two component carriers may have different numerologies. The at least two component carriers having different numerologies may involve that the at least two component carriers are having different subcarrier spacing. The at least two component carriers having different numerologies may involve that the at least two component carriers are having different slut durations.

Some additional embodiments are described below:

In a particular embodiment, the conditions can be satisfied for all reference slot durations (among the configured CCs).

In a particular embodiment, the conditions can be satisfied for a reference slot duration e.g. for FR1, 0.5 ms, and/or for FR1/FR2, the slot duration corresponding to the SCS associated with the data channel (for PDSCH, use SCS for downlink data channel, and for PUSCH, use SCS for the uplink data channel). The reference slot duration may be the shortest slot duration across all configured component carriers.

Note: FR1 refers to frequency range 1 or below 6 GHz, and FR2 refers to frequency range 2 or mmWave frequencies In a particular embodiment, the conditions can be satisfied for a subset of reference slot durations e.g. for FR1, 1 and 0.5 ms, and/or for FR1/FR2, the slot duration corresponding to the SCS associated with the data channel (for PDSCH, use SCS for downlink data channel, and for PUSCH, use SCS for the uplink data channel).

In a particular embodiment, the component carrier used for determining the reference slot duration can be based on one or more UE capabilities/configuration such as number of spatial layers supported, or a modulation scheme supported, receiver bandwidth etc. For instance, the carrier on which a back-loaded DMRS is configured.

In a particular embodiment, the sum TBS is based on the bandwidth part information for a corresponding slot of a component carrier in determining the number of information bits or reference information bits.

In a particular embodiment, the conditions can be applied per cell group. In dual connectivity, the conditions can be applied separately for each cell group.

In a particular embodiment, the conditions can be applied per PUCCH cell group per cell group. In dual connectivity, the conditions can be applied separately per PUCCH cell group for each cell group.

In a particular embodiment, the respective conditions are applied for carriers within a band in CA case e.g. the maximum data rate may be calculated on carriers per-band or there may be certain constraint such as a semi-static constraint on the data rate among carriers of different bands.

In a particular embodiment, the reference data rate is a maximum data rate of the user equipment on the plurality of component carriers.

In a particular embodiment, the respective conditions are applied for carrier within a cell group or within a PUCCH cell group e.g. the maximum data rate can be calculated on the carriers per-band using only the scaling factor applicable for that band.

In a particular embodiment, the UE is capable of EN-DC or LTE-NR dual connectivity and/or is configured with LTE-NR dual connectivity, and the peak rate is the peak rate corresponding to the NR portion of LTE-NR dual connectivity and the carriers are the carriers associated with the NR cells.

In a particular embodiment, the UE is capable of NR-NR DC (dual connectivity) and/or is configured with LTE-NR dual connectivity, and the peak rate is a peak rate corresponding to first NR macro cell group and the carriers are the carriers associated with the first NR primary cell group, and associated conditions applicable within the first cell group. The peak rate corresponding to the first NR cell group determined from the band/band-combination signaling associated with the first NR cell group.

the peak rate is a peak rate corresponding to NR secondary cell group and the carriers are the carriers associated with the NR secondary cell group, and associated conditions applicable within the secondary cell group. The peak rate corresponding to the NR secondary cell group determined from the band/band-combination signaling associated with the secondary cell group.

Example: NR-NR DC may have primary cell group corresponding to carriers in FR1, and a secondary cell group corresponding to carriers in FR2. A band/band combination for FR1 and FR2 can indicate support of NR-NR DC with MCG on FR1 and SCG on FR2 (or vice-versa).

In a particular embodiment, the data rate is a maximum data rate based on the band/band combination signaling and configuration, which can be different or smaller than the peak rate which can be the maximum of the data rate computed based on a plurality of band/band combinations signaled by the UE.

In a particular embodiment, the sum TBS is calculated based on those transport block or blocks whose transmission end with reference slot duration. In one example, the decoder processing (such as decoding operation) can begin only after the entire transmission of transmission block or blocks is received.

In a particular embodiment, the sum TBS is calculated based on those code block or blocks whose transmission ends with reference slot duration. In one example, the decoder processing (such as decoding operation) can begin only after the entire transmission of code block or blocks is received.

The above approach can be generalized to any combination of transmissions durations on the carriers.

Figure 4:
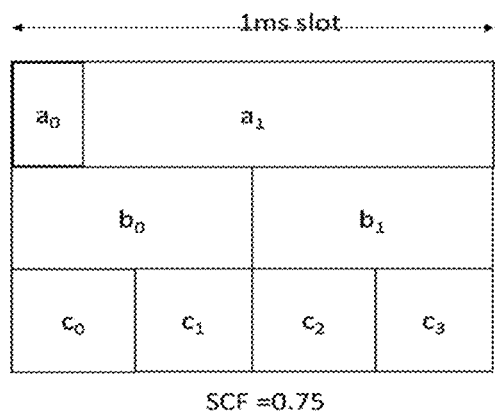
FIG. 4 illustrates an example where a TB $a_0$ occupies a portion of the slot, according to certain embodiments.

In a particular embodiment, the conditions can be applied for a reference time interval defined in number of symbols. FIG. 4 illustrates an example where a TB $a_0$ occupies a portion of the slot.

For the case illustrated in FIG. 4, the reference time intervals can be defined as $L_0$ on which $a_0$ is transmitted, and as $L_1$ over which $a_1$ is transmitted. Then the condition can be defined as $a_0+s_{b0}*b_0+s_{c0}*c_0<=DataRate*L_0$. In this case the scaling factors are defined suitably based on $L_0$ and time interval over which the corresponding overlapping transport blocks $b_0$ and $c_0$ are transmitted. The same principle can be applied for $a_1$ and so on.

If the condition is not satisfied (i.e. is exceeded), there are some different options for UE behavior:
1) UE may consider such a scheduling as an error case, and UE behavior is unspecified;
2) UE may skip decoding the transport block(s); if the UE skips decoding then it can indicate a NACK to the upper layers
    i. UE may or may not be able to store and soft combine received information;
3) UE may process the transport block(s) partially, e.g. provide ACK for the TBs or CBGs that were processed and NACK for the unfinished blocks;
4) For uplink, the UE may not be able to transmit since its transmission capability is exceeded, and hence may drop the transmission; if the different transmissions are scheduled by different PDCCHs occurring at different time instances, the UE may continue to transmit any ongoing transmissions, while dropping any transmissions that may cause UE transmission capability to be exceeded.

In a particular embodiment, transmitting a transmission may involve transmitting a transmission in downlink on one or more of PDSCH, PDCCH, and/or PBCH, or in uplink on one or more of PUSCH, PUCCH, and/or PRACH. Furthermore, receiving a transmission may involve receiving a transmission in downlink on one or more of PDSCH, PDCCH, and/or PBCH, or in uplink on one or more of PUSCH, PUCCH, and/or PRACH. The transmission may be transmitted or received on a plurality of downlink or uplink component carriers.

In a particular embodiment, transmitting a transmission may involve at least partially skip transmitting a transmission. At least partially skip transmitting a transmission may involve e.g. transmitting the transmission, transmitting any ongoing transmission, or dropping the transmission. Dropping the transmission may involve fully skip transmitting the transmission.

In a particular embodiment, receiving a transmission may involve at least partially skip decoding a transmission. At least partially skip decoding a transmission may involve e.g. decode the transmission, process the transport block(s) partially, or skip decoding the transmission.

While the techniques are described primarily from an uplink or downlink perspective, the same techniques may be applicable for sidelink, integrated access backhaul, and other forms of communication links in a cellular communication system.

Figure 5:
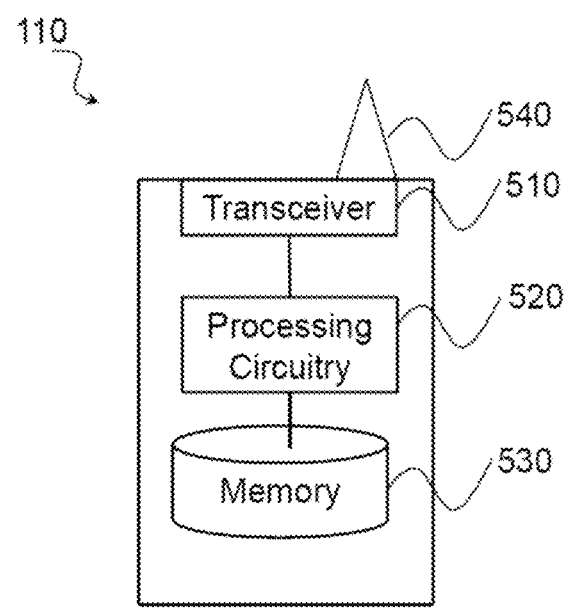
FIG. 5 is a block schematic of an exemplary wireless device, according to certain embodiments.

FIG. 5 is a block schematic of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, an actuator, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 510, processing circuitry 520, and memory 530. In some embodiments, transceiver 510 facilitates transmitting wireless signals to and receiving wireless signals from network node 115 (e.g., via antenna 540), processing circuitry 520 executes instructions to provide some or all of the functionality described herein as being provided by wireless device 110, and memory 530 stores the instructions executed by processing circuitry 520.

Processing circuitry 520 may include any suitable combination of hardware and software implemented in one or more modules to execute instructions and manipulate data to perform some or all of the described functions of wireless device 110, such as the functions of wireless device 110 described in relation to any of FIGS. 1-4. In some embodiments, processing circuitry 520 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 530 is generally operable to store instructions, such as a computer program, software, an application including one or more of logic, rules, algorithms, code, tables, etc. and/or other instructions capable of being executed by processing circuitry 520. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 520.

Other embodiments of wireless device 110 may include additional components beyond those shown in FIG. 5 that may be responsible for providing certain aspects of the wireless device's functionality, including any of the functionality described herein and/or any additional functionality (including any functionality necessary to support the solution described herein). As just one example, wireless device 110 may include input devices and circuits, output devices, and one or more synchronization units or circuits, which may be part of the processing circuitry 520. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 6:
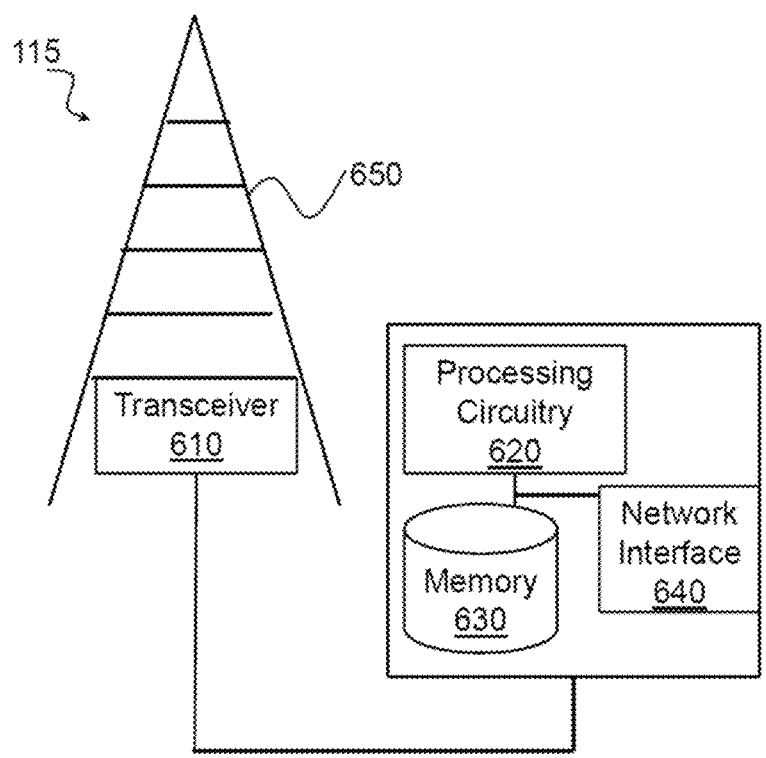
FIG. 6 is a block schematic of an exemplary network node, according to certain embodiments.

FIG. 6 is a block schematic of an exemplary network node 115, in accordance with certain embodiments. Network node 115 may be any type of radio network node or any network node that communicates with a UE and/or with another network node. Examples of network node 115 include an eNodeB, a gNB, a node B, a base station, a wireless access point (e.g., a Wi-Fi access point), a low power node, a base transceiver station (BTS), relay, donor node controlling relay, transmission points, transmission nodes, remote radio unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 610, processing circuitry 620, memory 630, and network interface 640. In some embodiments, transceiver 610 facilitates transmitting wireless signals to and receiving wireless signals from wireless device 110 (e.g., via antenna 650), processing circuitry 620 executes instructions to provide some or all of the functionality described herein as being provided by a network node 115, memory 630 stores the instructions executed by processing circuitry 620, and network interface 640 communicates signals to backend network components, such as a gateway, switch, router, Internet, Public Switched Telephone Network (PSTN), core network nodes or radio network controllers 130, etc.

Processing circuitry 620 may include any suitable combination of hardware and software implemented in one or more modules to execute instructions and manipulate data to perform some or all of the described functions of network node 115, such as those described in relation to any of FIGS. 1-4. In some embodiments, processing circuitry 620 may include, for example, one or more computers, one or more central processing units (CPUs), one or more microprocessors, one or more applications, and/or other logic.

Memory 630 is generally operable to store instructions, such as a computer program, software, an application including one or more of logic, rules, algorithms, code, tables, etc. and/or other instructions capable of being executed by processing circuitry 620. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information.

In some embodiments, network interface 640 is communicatively coupled to processing circuitry 620 and may refer to any suitable device operable to receive input for network node 115, send output from network node 115, perform suitable processing of the input or output or both, communicate to other devices, or any combination of the preceding. Network interface 640 may include appropriate hardware (e.g., port, modem, network interface card, etc.) and software, including protocol conversion and data processing capabilities, to communicate through a network.

Other embodiments of network node 115 may include additional components beyond those shown in FIG. 6 that may be responsible for providing certain aspects of the radio network node's functionality, including any of the functionality described herein and/or any additional functionality (including any functionality necessary to support the solutions described herein). The various different types of network nodes may include components having the same physical hardware but configured (e.g., via programming) to support different radio access technologies, or may represent partly or entirely different physical components.

NUMBERED EXAMPLES

1. A method by a wireless device for scheduling and processing one or more transport blocks/code blocks, the method comprising:
acquiring configuration for a plurality of component carriers, wherein each component carrier is associated with at least one numerology, wherein the at least one numerology is associated with a corresponding slot duration of the component carrier;
acquiring at least one reference slot duration from the slot durations associated with the plurality of the component carriers;
comparing a total number of information bits scheduled within a reference slot interval across the component carriers (A) with a reference value (B) based on a data rate and the reference slot duration; and
based on the comparing, performing an action related to processing of the one or more transport blocks/code blocks on at least one component carrier on a slot that overlaps the reference slot interval.

2. The method of example 1, wherein the one or more transport blocks/code blocks comprise one or more transport blocks or one or more code blocks.

3. The method of any one of examples 1 to 2, wherein the reference slot duration is a minimum of slot durations across the plurality of component carriers.

4. The method of any one of examples 1 to 3, wherein a number of information bits for a particular component carrier is obtained based on at least one of:
 a. a number of transport block/code block bits within a slot of a component carrier, the slot overlapping the reference slot interval (X),
 b. the at least one numerology of the component carrier (mu), and
 c. the at least one numerology corresponding to the reference slot interval (mu_ref)

5. The method of any one of examples 1 to 4, wherein the reference slot duration is a slot duration for a primary component carrier.

6. The method of any one of examples 1 to 5, wherein the action being one of a skip decoding and a partial skip decoding for a reception if A<=B.

7. The method of any one of examples 1 to 5, wherein the action being one of a skip transmitting, a partial skip transmitting, and a dropping for a transmission if A<=B.

8. The method of any one of examples 1 to 7, wherein the comparing is performed for a plurality of reference slot durations, and the action is performed if the comparing yields a condition that is not satisfied for at least one reference slot duration.

9. The method of any one of examples 1 to 8, wherein the reference slot durations include all slot durations associated with the plurality of the component carriers.

10. The method of example 4, wherein the number of information bits for a component carrier is obtained as $X*2^{(mu-mu\_ref)}$.

11. The method of any one of examples 1 to 10, wherein the reference value is determined as data rate*reference slot duration.

12. The method of any one of examples 1 to 11, wherein a subcarrier spacing (SCS) and slot durations are based on an active bandwidth part for a particular component carrier.

13. The method of any one of examples 1 to 12, wherein the rate is based from UE capability signaling, comprising at least one or more of a supported modulation order, number of layers, bandwidth, scaling factor.

14. The method of any one of examples 1 to 13, wherein at least two component carriers have different numerologies.

15. The method of any one of examples 1 to 14, wherein the data rate is a peak data rate.

16. A computer program comprising instructions which when executed on a computer perform any of the methods of examples 1 to 15.

17. A computer program product comprising computer program, the computer program comprising instructions which when executed on a computer perform any of the methods of examples 1 to 15.

18. A non-transitory computer readable medium storing instructions which when executed by a computer perform any of the methods of examples 1 to 15.

19. A wireless device comprising:
  memory operable to store instructions; and
  processing circuitry operable to execute the instructions to cause the wireless device to perform any of examples 1 to 15.

20. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the UE
    acquires configuration for a plurality of component carriers, wherein each component carrier is associated with at least one numerology, wherein the at least one numerology is associated with a corresponding slot duration of the component carrier;
    acquires at least one reference slot duration from the slot durations associated with the plurality of the component carriers;
    compares a total number of information bits scheduled within a reference slot interval across the component carriers (A) with a reference value (B) based on a data rate and the reference slot duration; and
    based on the comparing, performs an action related to processing of the one or more transport blocks/code blocks on at least one component carrier on a slot that overlaps the reference slot interval.

21. The method of example 20, further comprising:
  at the UE, receiving the user data from the base station.

22. A communication system including a host computer comprising:
  processing circuitry configured to provide user data; and
  a communication interface configured to forward user data to a cellular network for transmission to a user equipment (UE),
  wherein the UE comprises a radio interface and processing circuitry, the UE's processing circuitry configured to
    acquire configuration for a plurality of component carriers, wherein each component carrier is associated with at least one numerology, wherein the at least one numerology is associated with a corresponding slot duration of the component carrier;
    acquire at least one reference slot duration from the slot durations associated with the plurality of the component carriers;
    compare a total number of information bits scheduled within a reference slot interval across the component carriers (A) with a reference value (B) based on a data rate and the reference slot duration; and
    based on the comparing, perform an action related to processing of the one or more transport blocks/code blocks on at least one component carrier on a slot that overlaps the reference slot interval.

23. The communication system of example 22, further including the UE.

24. The communication system of example 23, wherein the cellular network further includes a base station configured to communicate with the UE.

25. The communication system of example 22 or 23, wherein:
  the processing circuitry of the host computer is configured to execute a host application, thereby providing the user data; and
  the UE's processing circuitry is configured to execute a client application associated with the host application.

26. A user equipment (UE) configured to communicate with a base station, the UE comprising a radio interface and processing circuitry configured to
  acquire configuration for a plurality of component carriers, wherein each component carrier is associated with at least one numerology, wherein the at least one numerology is associated with a corresponding slot duration of the component carrier;
  acquire at least one reference slot duration from the slot durations associated with the plurality of the component carriers;
  compare a total number of information bits scheduled within a reference slot interval across the component carriers (A) with a reference value (B) based on a data rate and the reference slot duration; and
  based on the comparing, perform an action related to processing of the one or more transport blocks/code blocks on at least one component carrier on a slot that overlaps the reference slot interval.

27. A communication system including a host computer comprising:
  a communication interface configured to receive user data originating from a transmission from a user equipment (UE) to a base station,
  wherein the UE comprises a radio interface and processing circuitry, the UE's processing circuitry configured to:
    acquire configuration for a plurality of component carriers, wherein each component carrier is associated with at least one numerology, wherein the at least one numerology is associated with a corresponding slot duration of the component carrier;
    acquire at least one reference slot duration from the slot durations associated with the plurality of the component carriers;

compare a total number of information bits scheduled within a reference slot interval across the component carriers (A) with a reference value (B) based on a data rate and the reference slot duration; and based on the comparing, perform an action related to processing of the one or more transport blocks/code blocks on at least one component carrier on a slot that overlaps the reference slot interval.

28. The communication system of example 27, further including the UE.

29. The communication system of example 28, further including the base station, wherein the base station comprises a radio interface configured to communicate with the UE and a communication interface configured to forward to the host computer the user data carried by a transmission from the UE to the base station.

30. The communication system of example 28 or 29, wherein:
the processing circuitry of the host computer is configured to execute a host application; and
the UE's processing circuitry is configured to execute a client application associated with the host application, thereby providing the user data.

31. The communication system of example 28 or 29, wherein:
the processing circuitry of the host computer is configured to execute a host application, thereby providing request data; and
the UE's processing circuitry is configured to execute a client application associated with the host application, thereby providing the user data in response to the request data.

32. A method implemented in a user equipment (UE), comprising:
acquiring configuration for a plurality of component carriers, wherein each component carrier is associated with at least one numerology, wherein the at least one numerology is associated with a corresponding slot duration of the component carrier;
acquiring at least one reference slot duration from the slot durations associated with the plurality of the component carriers;
comparing a total number of information bits scheduled within a reference slot interval across the component carriers (A) with a reference value (B) based on a data rate and the reference slot duration; and
based on the comparing, performing an action related to processing of the one or more transport blocks/code blocks on at least one component carrier on a slot that overlaps the reference slot interval.

33. The method of example 32, further comprising:
providing user data; and
forwarding the user data to a host computer via the transmission to the base station.

34. A method implemented in a communication system including a host computer, a base station and a user equipment (UE), the method comprising:
at the host computer, receiving user data transmitted to the base station from the UE, wherein the UE
acquires configuration for a plurality of component carriers, wherein each component carrier is associated with at least one numerology, wherein the at least one numerology is associated with a corresponding slot duration of the component carrier;
acquires at least one reference slot duration from the slot durations associated with the plurality of the component carriers;

compares a total number of information bits scheduled within a reference slot interval across the component carriers (A) with a reference value (B) based on a data rate and the reference slot duration; and based on the comparing, performs an action related to processing of the one or more transport blocks/code blocks on at least one component carrier on a slot that overlaps the reference slot interval.

35. The method of example 34, further comprising:
at the UE, providing the user data to the base station.

36. The method of example 35, further comprising:
at the UE, executing a client application, thereby providing the user data to be transmitted; and
at the host computer, executing a host application associated with the client application.

37. The method of example 36, further comprising:
at the UE, executing a client application; and
at the UE, receiving input data to the client application, the input data being provided at the host computer by executing a host application associated with the client application,
wherein the user data to be transmitted is provided by the client application in response to the input data.

38. A method in a network node for scheduling one or more transport blocks/code blocks for a wireless device, the method comprising:
acquiring a configuration for a plurality of component carriers, wherein each component carrier is associated with at least one numerology, wherein each numerology is associated with a corresponding a slot duration of a component carrier, and associated capability signaling for the wireless device;
acquiring at least one reference slot duration from the slot durations associated with the plurality of the component carriers; and
scheduling the one or more transport blocks/code blocks to the wireless device on the component carriers on their respective slots that overlap the reference slot interval, wherein a total number of information bits scheduled within the reference slot interval across the component carriers (A) is no larger than a reference value (B) based on a peak data rate and the reference slot duration, the peak data rate calculated based on the capability signaling of the wireless device.

39. The method of example 38, wherein the one or more transport blocks/code blocks comprise one or more transport blocks or one or more code blocks.

40. The method of any one of examples 38 to 39, wherein the reference slot duration is a minimum of slot durations across the plurality of component carriers.

41. The method of any one of examples 38 to 40, wherein a number of information bits for a particular component carrier is obtained based on at least one of:
a. a number of transport block/code block bits within a slot of a component carrier, the slot overlapping the reference slot interval (X),
b. the numerology of the component carrier (mu),
c. the numerology corresponding to the reference slot interval (mu_ref).

42. A computer program comprising instructions which when executed on a computer perform any of the methods of examples 38 to 41.

43. A computer program product comprising computer program, the computer program comprising instructions which when executed on a computer perform any of the methods of examples 38 to 41.

44. A non-transitory computer readable medium storing instructions which when executed by a computer perform any of the methods of examples 38 to 41.

45. A network node comprising:
   memory operable to store instructions; and
   processing circuitry operable to execute the instructions to cause the wireless device to perform any of examples 38 to 41.

46. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs
      acquiring a configuration for a plurality of component carriers, wherein each component carrier is associated with at least one numerology, wherein each numerology is associated with a corresponding a slot duration of a component carrier, and associated capability signaling for the UE;
      acquiring at least one reference slot duration from the slot durations associated with the plurality of the component carriers; and
      scheduling the one or more transport blocks/code blocks to the wireless device on the component carriers on their respective slots that overlap the reference slot interval, wherein a total number of information bits scheduled within the reference slot interval across the component carriers (A) is no larger than a reference value (B) based on a peak data rate and the reference slot duration, the peak data rate calculated based on the capability signaling of the UE.

47. The method of example 46, further comprising:
   at the base station, transmitting the user data.

48. The method of example 47, wherein the user data is provided at the host computer by executing a host application, the method further comprising:
   at the UE, executing a client application associated with the host application.

49. A method implemented in a communication system including a host computer, a base station and a user equipment (UE), the method comprising:
   at the host computer, receiving, from the base station, user data originating from a transmission which the base station has received from the UE, wherein the base station
      acquires a configuration for a plurality of component carriers, wherein each component carrier is associated with at least one numerology, wherein each numerology is associated with a corresponding a slot duration of a component carrier, and associated capability signaling for the UE;
      acquires at least one reference slot duration from the slot durations associated with the plurality of the component carriers; and
      schedules the one or more transport blocks/code blocks to the wireless device on the component carriers on their respective slots that overlap the reference slot interval, wherein a total number of information bits scheduled within the reference slot interval across the component carriers (A) is no larger than a reference value (B) based on a peak data rate and the reference slot duration, the peak data rate calculated based on the capability signaling of the UE.

50. The method of example 49, further comprising:
   at the base station, receiving the user data from the UE.

51. The method of example 50, further comprising:
   at the base station, initiating a transmission of the received user data to the host computer.

52. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to:
      acquire a configuration for a plurality of component carriers, wherein each component carrier is associated with at least one numerology, wherein each numerology is associated with a corresponding a slot duration of a component carrier, and associated capability signaling for the UE;
      acquire at least one reference slot duration from the slot durations associated with the plurality of the component carriers; and
      schedule the one or more transport blocks/code blocks to the wireless device on the component carriers on their respective slots that overlap the reference slot interval, wherein a total number of information bits scheduled within the reference slot interval across the component carriers (A) is no larger than a reference value (B) based on a peak data rate and the reference slot duration, the peak data rate calculated based on the capability signaling of the UE.

53. The communication system of example 52, further including the base station.

54. The communication system of example 53, further including the UE, wherein the UE is configured to communicate with the base station.

55. The communication system of example 54, wherein:
   the processing circuitry of the host computer is configured to execute a host application, thereby providing the user data; and
   the UE comprises processing circuitry configured to execute a client application associated with the host application.

56. A communication system including a host computer comprising a communication interface configured to receive user data originating from a transmission from a user equipment (UE) to a base station, wherein the base station comprises a radio interface and processing circuitry, the base station's processing circuitry configured to
   acquiring a configuration for a plurality of component carriers, wherein each component carrier is associated with at least one numerology, wherein each numerology is associated with a corresponding a slot duration of a component carrier, and associated capability signaling for the UE;
   acquiring at least one reference slot duration from the slot durations associated with the plurality of the component carriers; and
   scheduling the one or more transport blocks/code blocks to the wireless device on the component carriers on their respective slots that overlap the reference slot interval, wherein a total number of information bits scheduled within the reference slot interval across the component carriers (A) is no larger than a reference value (B) based on a peak data rate and the reference slot duration, the peak data rate calculated based on the capability signaling of the UE.

57. The communication system of example 56, further including the base station.

58. The communication system of example 57, further including the UE, wherein the UE is configured to communicate with the base station.

59. The communication system of example 58, wherein:
the processing circuitry of the host computer is configured to execute a host application;
the UE is configured to execute a client application associated with the host application, thereby providing the user data to be received by the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1×Radio Transmission Technology
3GPP 3rd Generation Partnership Project
5G 5th Generation
5GS 5G System
5QI 5G QoS Identifier
ABS Almost Blank Subframe
AN Access Network
AN Access Node
ARQ Automatic Repeat Request
AS Access Stratum
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CN Core Network
CP Cyclic Prefix
CPICH Common Pilot Channel
CPICH Ec/No CPICH Received energy per chip divided by the power density in the band
CQI Channel Quality indicator
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eMBB Enhanced Mobile BroadBand
eNB E-UTRAN NodeB
ePDCCH enhanced Physical Downlink Control Channel
EPS Evolved Packet System
E-SMLC evolved Serving Mobile Location Center
E-UTRA Evolved UTRA
E-UTRAN Evolved Universal Terrestrial Radio Access Network
FDD Frequency Division Duplex
FFS For Further Study
GERAN GSM EDGE Radio Access Network
gNB gNode B (a base station in NR; a Node B supporting NR and connectivity to NGC)
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NGC Next Generation Core
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Power Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PS Packet Switched
PSS Primary Synchronization Signal
PUCCH Physical Uplink Control Channel
PUSCH Physical Uplink Shared Channel
RACH Random Access Channel
QAM Quadrature Amplitude Modulation
RAB Radio Access Bearer
RAN Radio Access Network
RANAP Radio Access Network Application Part
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference RWR Release with Redirect
SCH Synchronization Channel
SCell Secondary Cell
SCS Subcarrier Spacing
SDU Service Data Unit
SFN System Frame Number
SGW Serving Gateway
SI System Information
SIB System Information Block
SNR Signal to Noise Ratio
S-NSSAI Single Network Slice Selection Assistance Information
SON Self Optimized Network
SS Synchronization Signal
SSS Secondary Synchronization Signal
TBS Transport Block Size
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method by a network node in a wireless communication system, the network node being configured to communicate with a user equipment, the user equipment being configured for operation in carrier aggregation comprising a plurality N of component carriers, wherein each component carrier of the plurality of N component carriers is associated with a slot duration that corresponds to a numerology of that component carrier, the method comprising:
   transmitting or receiving a transmission on at least one of the component carriers,
   wherein the transmitting or receiving on the at least one of the component carriers is based on a relation between a number of information bits scheduled on the plurality of N component carriers over one or more reference slot durations and a reference data rate, and
   wherein N is an integer greater than zero.

2. The method of claim 1, wherein at least two component carriers of the plurality of N component carriers have different numerologies.

3. The method of claim 1, wherein the relation corresponds to $$\sum_{n=0}^{N-1} TBS_n * 2^{\mu_n - \mu_{ref}} \leq DataRate * 0.001 * 2^{-\mu_{ref}}$$

wherein $TBS_n$ is a transport block size scheduled on the n:th component carrier over a reference time duration, wherein $0.001*2^{-\mu_{ref}}$ is the reference time duration, wherein $\mu_n$ is the numerology associated with the n:th component carrier, wherein $0.001*2^{-\mu_n}$ is the slot duration associated with the n:th component carrier, and wherein DataRate is the reference data rate.

4. The method of claim 1, wherein the one or more reference slot durations include at least the slot duration associated with a component carrier of the plurality of N component carriers.

5. The method of claim 1, wherein the number of information bits is based on at least a number of transport block bits within a slot of the plurality of N component carriers.

6. The method of claim 1, wherein the reference data rate is a maximum data rate of the user equipment on the plurality of N component carriers.

7. A network node configured to communicate with a user equipment, the user equipment being configured for operation in carrier aggregation comprising a plurality of N component carriers, wherein each component carrier of the plurality of N component carriers is associated with a slot duration that corresponds to a numerology of that component carrier, the network node comprising a radio interface and processing circuitry configured to cause the network node to:
   transmit or receive a transmission on at least one of the component carriers,
   wherein the transmitting or receiving on the at least one of the component carriers is based on a relation between a number of information bits scheduled on the plurality of N component carriers over one or more reference slot durations and a reference data rate, and
   wherein N is an integer greater than zero.

8. The network node of claim 7, wherein at least two component carriers of the plurality of N component carriers have different numerologies.

9. The network node of claim 7, wherein the relation corresponds to $$\sum_{n=0}^{N-1} TBS_n * 2^{\mu_n - \mu_{ref}} \leq DataRate * 0.001 * 2^{-\mu_{ref}}$$

wherein $TBS_n$ is a transport block size scheduled on the n:th component carrier over a reference time duration, wherein $0.001*2^{-\mu_{ref}}$ is the reference time duration, wherein $\mu_n$ is the numerology associated with the n:th component carrier, wherein $0.001*2^{-\mu_n}$ is the slot duration associated with the n:th component carrier, and wherein DataRate is the reference data rate.

10. The network node of claim 7, wherein the one or more reference slot durations include at least the slot duration associated with a component carrier of the plurality of N component carriers.

11. The network node of claim 7, wherein the number of information bits is based on at least a number of transport block bits within a slot of the plurality of N component carriers.

12. The network node of claim 7, wherein the reference data rate is a maximum data rate of the user equipment on the plurality of N component carriers.

* * * * *

UNITED STATES PATENT AND TRADEMARK OFFICE
CERTIFICATE OF CORRECTION

PATENT NO. : 11,632,205 B2
APPLICATION NO. : 17/207920
DATED : April 18, 2023
INVENTOR(S) : Nimbalker et al.

It is certified that error appears in the above-identified patent and that said Letters Patent is hereby corrected as shown below:

In the Specification

In Column 1, Line 10, delete "Aerial No." and insert -- Ser. No. --, therefor.

Figure 1:
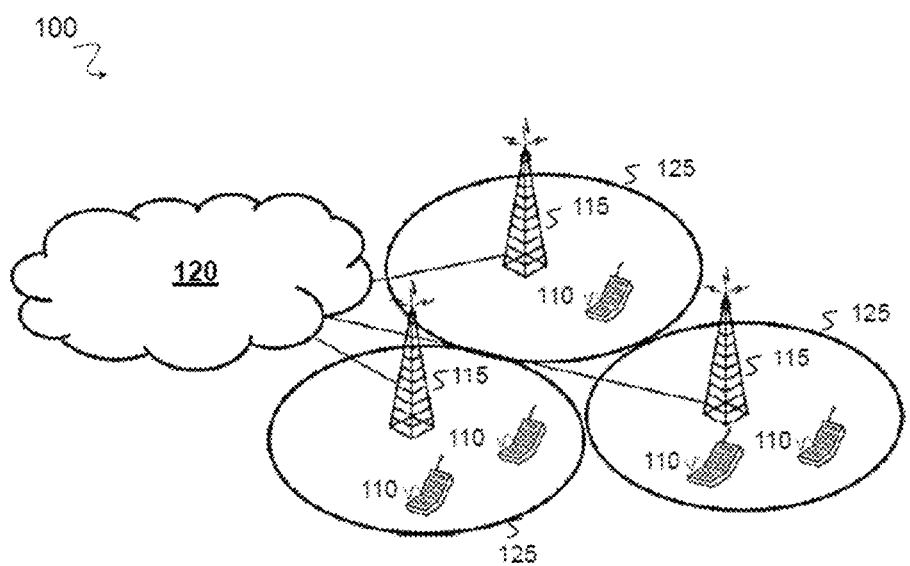
FIG. 1 is a block diagram illustrating an embodiment of a network, according to certain embodiments.

In Column 4, Line 50, delete "FIG. 2" and insert -- FIG. 1 --, therefor.

In Column 5, Line 39, delete "ENB," and insert -- eNB, --, therefor.

In Column 5, Lines 57-58, delete "laptop embedded equipped (LEE)," and insert -- laptop embedded equipment (LEE), --, therefor.

In Column 7, Line 36, delete "$v_{layers}^{(j)}$" and insert -- $V_{Layers}^{(j)}$ --, therefor.

In Column 11, Lines 23-24, in Equation (5), delete

"$$\frac{a_0}{a_0} + b_1 + c_2 + c_3 \leq DataRate * 0.5 \ ms$$"

and insert $$\frac{a_0}{2} + b_1 + c_2 + c_3 \leq DataRate * 0.5 \ ms$$

--, therefor.

In Column 11, Line 53, delete "$0.001 * 2^{-\mu_{ref}}$" and insert -- $0.001 * 2^{-\mu_{ref}}$, --, therefor.

In Column 11, Line 56, delete "$\mu_n \rightarrow \mu_{ref}$," and insert -- $\mu_n > \mu_{ref}$, --, therefor.

In Column 25, Line 56, delete "E-SMLC Evolved-Serving Mobile Location Centre".

Signed and Sealed this
Fifth Day of March, 2024

Katherine Kelly Vidal
*Director of the United States Patent and Trademark Office*

CERTIFICATE OF CORRECTION (continued)

In Column 26, Line 42, delete "PMI Precoder Matrix Indicator" and insert -- PMI Precoding Matrix Indicator --, therefor.

In Column 27, Line 29, delete "WCDMA Wide CDMA" and insert -- WCDMA Wideband CDMA --, therefor.

In Column 27, Line 30, delete "WLAN Wide Local Area Network" and insert -- WLAN Wireless Local Area Network --, therefor.

In the Claims

In Column 27, Lines 35-36, in Claim 1, delete "a plurality N of component carriers," and insert -- a plurality of N component carriers, --, therefor.

In Column 27, Lines 55-57, in Claim 3, delete

" $$\sum_{n=0}^{N-1} TBS_n * 2^{\mu_n - \mu_{ref}} \leq DataRate * 0.001 * 2^{-\mu_{ref}}$$ " and insert -- $$\sum_{n=0}^{N-1} TBS_n * 2^{\mu_n - \mu_{ref}} \leq DataRate * 0.001 * 2^{-\mu_{ref}}$$ --, therefor.

In Column 28, Lines 38-40, in Claim 9, delete

" $$\sum_{n=0}^{N-1} TBS_n * 2^{\mu_n - \mu_{ref}} \leq DataRate * 0.001 * 2^{-\mu_{ref}}$$ " and insert -- $$\sum_{n=0}^{N-1} TBS_n * 2^{\mu_n - \mu_{ref}} \leq DataRate * 0.001 * 2^{-\mu_{ref}}$$ --, therefor.